Nov. 3, 1970 W. M. LEEDS 3,538,282
FLUID-BLAST CIRCUIT INTERRUPTERS WITH EXHAUST VALVES
RESPONSIVE SOLELY TO THE PRESSURE GENERATED
BY AN ARC OF EXCESSIVE MAGNITUDE
Filed Nov. 29, 1966 5 Sheets-Sheet 1

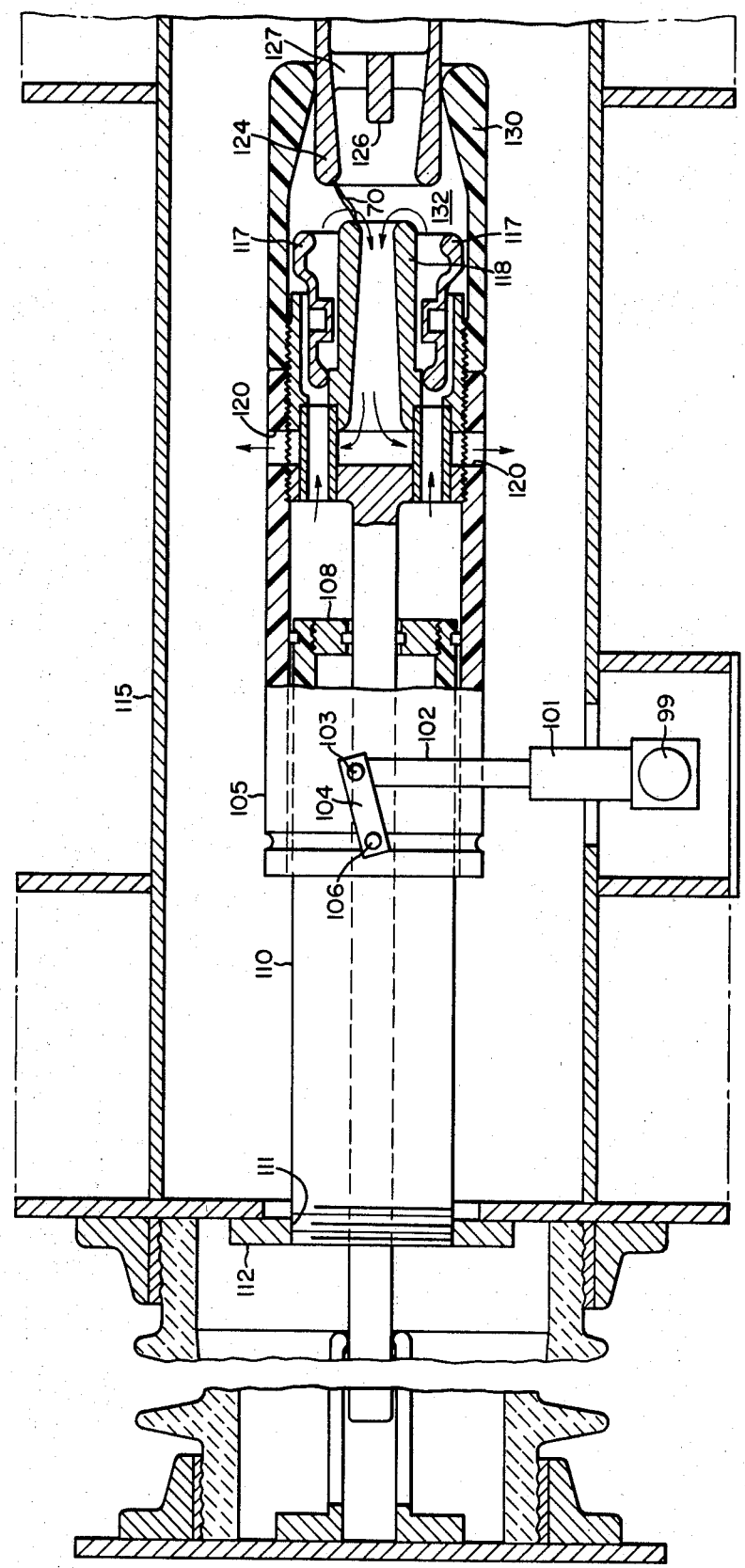

United States Patent Office 3,538,282
Patented Nov. 3, 1970

3,538,282
FLUID-BLAST CIRCUIT INTERRUPTERS WITH EXHAUST VALVES RESPONSIVE SOLELY TO THE PRESSURE GENERATED BY AN ARC OF EXCESSIVE MAGNITUDE
Winthrop M. Leeds, Pittsburgh, Pa., assignor to Westinghouse Electric Corporation, Pittsburgh, Pa., a corporation of Pennsylvania
Filed Nov. 29, 1966, Ser. No. 597,690
Int. Cl. H01h 33/70
U.S. Cl. 200—148   9 Claims

ABSTRACT OF THE DISCLOSURE

A fluid-blast circuit interrupter is provided having a pair of separable cooperable venting contacts, one of which having an overpressure exhaust valve controlling the venting of the fluid flow therethrough, and disposed in close proximity to the arcing region. Means are provided to send a flow of fluid through the other venting contact, either by a cavitation device, or by means of a piston-and-cylinder arrangement. Dependent upon the magnitude of the current being interrupted, the arcing pressure is positively controlled, and upon attaining a certain predetermined pressure level, effects the opening of the overpressure exhaust valve controlling the flow of fluid through said one contact, to thereby intensify the interrupting action by obtaining a controlled flow of fluid through both separated contacts.

The exhaust valve is solely responsive to the pressure value generated within the arcing region, but this pressure value will not be great enough unless an excessive current of a predetermined value is interrupted.

Electrostatic shields are provided, encircling the separable contacts, to control the electrical field between the separated contacts so as to minimize the possibility of restriking of the arc between the contacts during the opening operation. Also, magnetic means may be employed to effect an elongation of the established arc to thereby intensify the arcing pressure established thereat.

---

This invention relates, generally, to fluid-blast types of circuit interrupters and, more particularly, to fluid-blast circuit interrupters of the puffer-type having an exhaust valve associated with the separable contact structure to provide an auxiliary exhaust blast to atmosphere during very high-current interruption.

A general object of the present invention is to provide an improved fluid-blast circuit interrupter, particularly of the puffer-type, in which more effective operation is obtained during high-current interruption.

Another object of the present invention is to provide an improved fluid-blast type of circuit interrupter in which back-pressure exerted by the arcing pressure is reduced during heavy fault-current interruption.

Still a further object of the present invention is the provision of an improved downstream-type of circuit interrupter in which an exhausting flow through the movable contact structure takes place to a cavitation region, and in which the other cooperable contact is provided with an over-pressure exhaust blast valve actuated during heavy fault-current interruption.

Experience with fluid-blast circuit interrupters, such as those utilizing sulfur-hexafluoride ($SF_6$) gas, for example, using puffer pistons to supply gas flow for arc interruption, has shown good operation over a current range up to 25,000 amperes. When attempting to interrupt still higher currents, the back-pressure, produced by the high-temperature arc, tends to stall the puffer piston action, and the circuit breaker may be unable to open the connected circuit. Several ways that have been proposed heretofore to handle these high currents include the use of a powerful hydraulic accelerating force, such as set forth in U.S. Pat. 3,075,060, issued Jan. 22, 1963 to Albert P. Strom, and assigned to the assignee of the instant application. Another way that has been suggested is the provision of a strong electromagnetic driving force with series coils inserted into the electrical circuit, such as set out, for example, in U.S. patent application filed Sept. 1, 1966, Ser. No. 576,740 by Russell E. Frink and William H. Fischer and also assigned to the assignee of the instant application.

Still another method that has been proposed to handle the high currents has been the introduction of the high-pressure auxiliary gas blast admitted trough an over-current responsive valve from a gas reservoir, such as set out in U.S. Pat. 3,257,533 issued June 21, 1966, to Winthrop M. Leeds, and likewise assigned to the assignee of the present application.

The present invention proposes an entirely new approach for extending the interrupting range of a fluid-blast circuit interrupter, such as the puffer-type. It is particularly adaptable to the downstream puffer-type circuit interrupter, such as set forth in U.S. patent application filed Sept. 30, 1964, Ser. No. 400,366, now U.S. Pat. 3,290,469, issued Dec. 6, 1966 to Winthrop M. Leeds, and assigned to the assignee of the instant application. In such a type of circuit breaker, as set forth in the last-mentioned patent application, the gas is stored in the interrupting chamber at a moderately high value, say, for example, 100 p.s.i.g. Accordingly, it is a further object of the present invention to improve upon the fluid-blast types of circuit interrupters set forth in the heretofore-mentioned patent applications, rendering them of improved construction and highly effective for heavy fault-current interruption.

Still a further object of the present invention is the provision of an improved separable contact structure for a fluid-blast circuit interrupter in which one of two separable contacts is provided with an exhaust valve opened upon over-pressure for high-current interruption only, and the other cooperable contact has associated therewith a fluid blast provided by either a downstream action, or an upstream action.

Still a further object of the present invention is the provision of an improved circuit interrupter of the type set type incorporating an exhaust valve opened only upon high-current interruption to obtain a supplementary fluid blast in which magnetic means are additionally associated with the contact structure to augment the normal increase of pressure, which occurs during high-current interruption. Such action may be brought about by the transfer of the established arc to an adjacently located arcing horn to expedite arc lengthening, and to thereby additionally increase the pressure of the established arc, thus expediting the exhaust-valve opening.

Still a further object of the present invention is the provision of an improved circuit interrupter of the type set forth in the immediately preceding paragraph in which pilot-valve operation is achieved by magnetic means associated with arc transfer to an arcing horn, and in which supplementary exhaust blast-valve opening is thereby achieved.

According to a preferred embodiment of the invention, there is provided a pair of separable contacts, one of which is tubular and is attached to a piston member of a cavitation device so that during the opening operation, pressurized fluid, such as sulfur-hexafluoride ($SF_6$) gas, may exhaust through such tubular contact into the cavitation region. Cooperable with the aforesaid movable tubular venting contact is a cooperable contact having associated therewith an exhaust overpressure valve only opened upon interrupting excessive current values.

According to another embodiment of the invention, the established arc is magnetically thrust toward an arcing horn, which tends to increase the arc length, and so additionally increase the local arcing pressures to expedite exhaust-valve opening.

Another embodiment of the present invention is similar to that mentioned in the preceding paragraph, but utilizes a pilot valve, which is magnetically actuated by a transfer of the arcing to an associated arcing horn by magnetic action. The opening of the pilot valve dumps the pressure behind a pressure-operated exhausting valve, which provides a supplementary exhausting fluid flow to additionally assist in arc interruption.

Still a further embodiment of the invention is particularly adaptable to upstream-types of circuit interrupters, such as those of the puffer-type, in which an operating cylinder, carrying the movable contact structure, is reciprocally moved over a spaced stationary piston and forces fluid into the arcing region between separable contacts. One of the separable contacts is provided with an exhaust valve, which opens on over-pressure for high-current interruption only, whereas the other contact, which may move with the movable operating cylinder, provides a venting action through the interior thereof.

Further objects and advantages will readily become apparent upon reading the following specification, taken in conjunction with the drawings, in which.

Figure 10B:
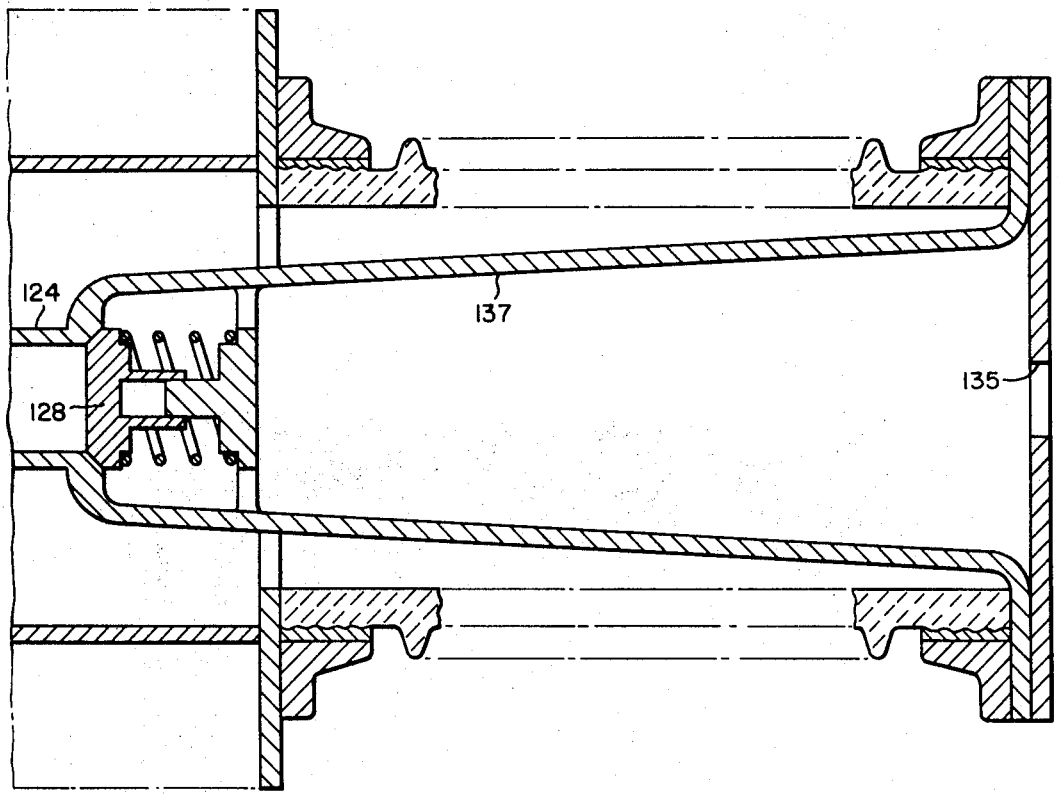
Figure 8:
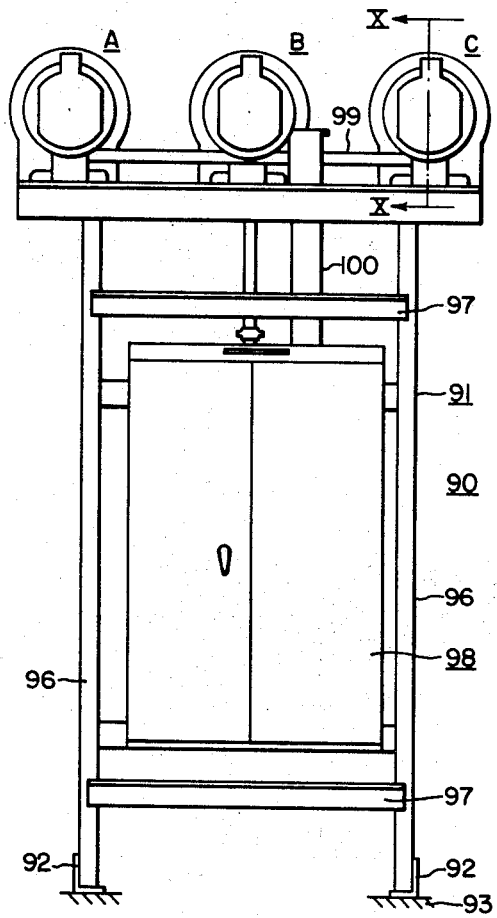
FIG. 8 is a front elevational view of a puffer-type breaker embodying principles of the present invention.
Figure 11:
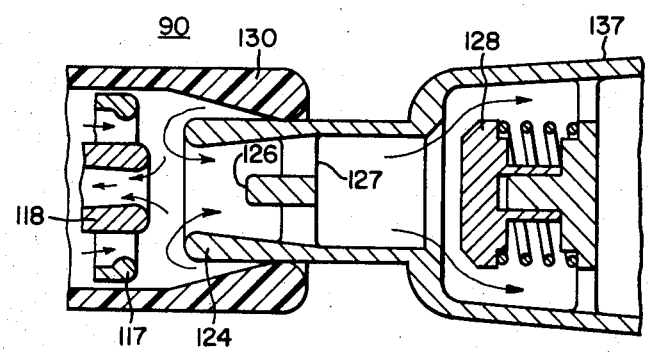

FIGS. 10A and 10B collectively show an enlarged vertical sectional view taken along the line X—X of FIG. 8, the contact structure being shown in the partially open-circuit position under relatively low-current conditions; and, FIG. 11 is a fragmentary view of the contact structure of the circuit breaker of FIGS. 10A and 10B, but illustrating the interrupting action during heavy fault-current interruption.

Figure 1:
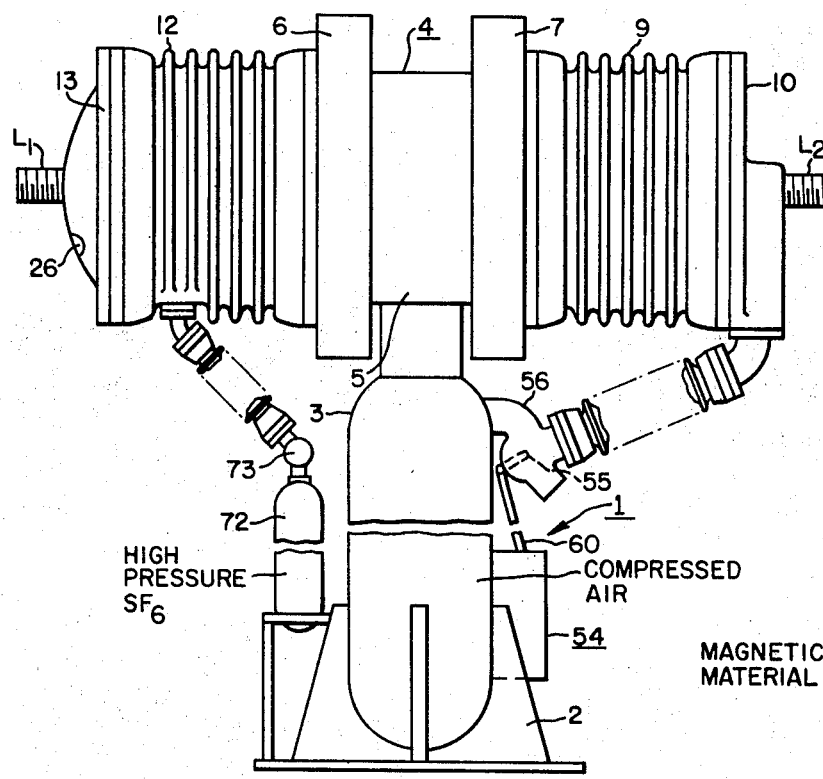
FIG. 1 is a side elevational view of a fluid-blast puffer-type circuit interrupter embodying the principles of the present invention.

Referring to the drawings, and more particularly to FIG. 1 thereof, the reference numeral 1 generally designates a compressed-gas circuit interrupter having a lower base 2, an upstanding cylindrical compressed-air reservoir cylinder 3, and an arc-extinguishing assemblage, generally designated by the reference numeral 4. The arc-extinguishing assemblage 4 generally comprises a centrally-located, grounded metallic casing 5 and a pair of laterally spaced current transformers 6, 7. In addition, the central grounded metallic casing member 5 has jutting outwardly therefrom a weatherproof insulating casing 9, at the end of which is a line terminal structure 10. Also extending in an opposite direction from the other end of the centrally-disposed grounded metallic casing member 5 is a second insulating weatherproof casing 12 having a line terminal structure 13 supported at the outer end thereof. A line connection $L_1$ may be attached to the terminal structure 13, as well understood by those skilled in the art.

Figure 2:
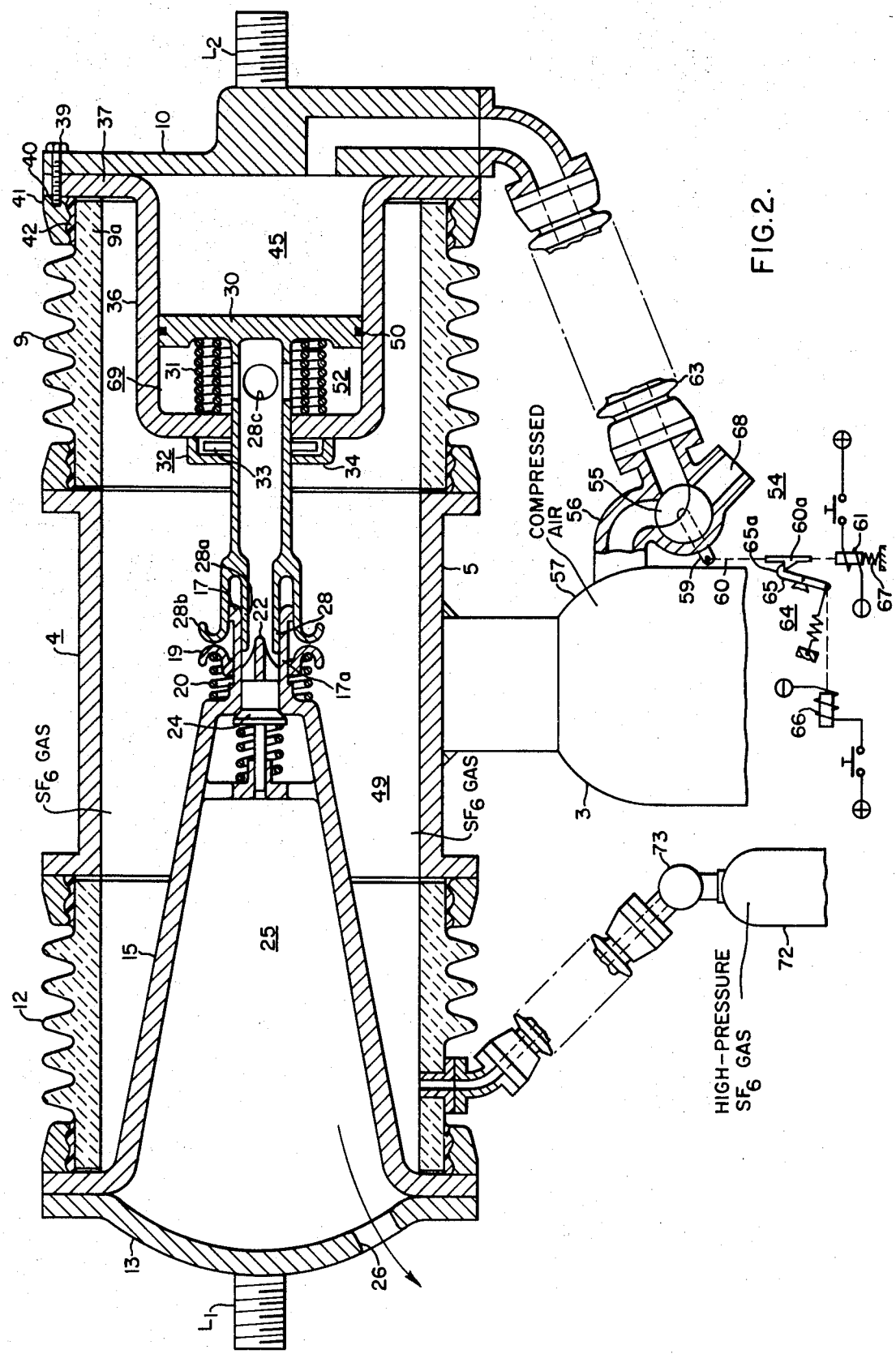
FIG. 2 is an enlarged vertical longitudinal sectional view taken through the circuit interrupter of FIG. 1, the contact structure being illustrated in the closed-circuit position.

Fixedly secured to the line-terminal structure 13 and extending longitudinally axially through the center of the weatherproof insulating casing 12 is a conically-shaped exhaust chamber 15 (FIG. 2), which has a stationary contact 17 secured thereto adjacent the right-hand end thereof. The relatively stationary contact structure 17 includes a tubular main contacting portion 17a surrounded by a movable retractable electro-static shield 19 biased by a spring 20 toward the right, as viewed in FIGS. 2–4. Additionally, the stationary contact structure 17 has an arcing horn 22 and a spring-biased-closed overpressure exhaust valve designated by the reference numeral 24.

It will be noted that the interior 25 of the inwardly-extending stationary exhaust support casting 15 has a communication to atmosphere by way of a vent opening 26.

Cooperating with the stationary contact structure 17 is a movable tubular venting contact 28 having a main contacting portion 28a and an outer configured electro-static shielding portion 28b. The tubular movable contact 28 is secured to a piston 30 (FIG. 2), which is biased to a rightward opening position by accelerating compression springs 31.

Figure 3:
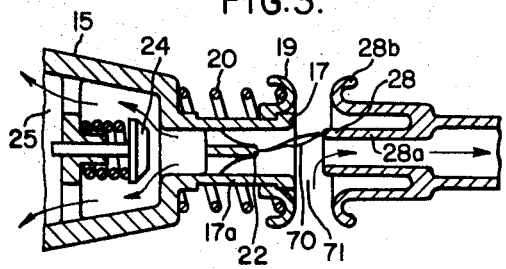
FIG. 3 is a fragmentary view of the separable contact structure of FIG. 2 illustrating the position of the several parts during the opening operation, with the exhaust value shown open, illustrating the action during heavy-fault current interruption.

Making resilient sliding contacting engagement with the movable tubular venting contact 28 is a relatively stationary contact structure 32, including a plurality of circumferentially disposed contact fingers 33, biased by suitable compression springs as shown in FIG. 3 of U.S. patent application filed Sept. 30, 1964, Ser. No. 400,366, W. M. Leeds, and assigned to the assignee of the present invention. The relatively stationary contact fingers 33 are disposed within a generally cylindrically-shaped contact housing 34, which is secured by suitable means, not shown, to a conducting metallic operating cylinder 36 having a radially outwardly-extending mounting flange portion 37 at the right-hand end thereof, as viewed in FIG. 2. Fixedly securing the operating cylinder 36 into a proper position is a plurality of mounting bolts 39, which extend into tapped apertures 40 provided in a flanged mounting ring 41, the latter being secured, as by a lead connection 42, to the right-hand extremity 9a of the weatherproof ceramic casing 9.

As more fully brought out hereinafter, the region 45 to the rear of the piston 30 is, at times, at a relatively low, or atmospheric pressure, and at other times is at a relatively high pressure, such as 150 p.s.i. for example, as brought about by the entrance of high-pressure gas from the compressed-air reservoir cylinder 3. The region 49 interiorly of the arc-extinguishing assemblage 4 is, however, filled with a suitable sealed arc-extinguishing gas, such as sulfur-hexafluoride ($SF_6$) gas, which may be at a pressure of, say 100 p.s.i.g. for example. It will, therefore, be apparent that no communication between the regions 45, 49 is desired, and to provide such a gas-tight seal, I preferably employ a "Teflon" piston seal ring 50.

It will be noted that rightward opening movement of the piston 30 and movable tubular contact 28 will create a cavitation, or a relatively low-pressure region within the space 52 in front of the piston 30. Since the movable tubular contact 28 is provided with communicating sidewall apertures 28c, sulfur-hexafluoride (SF$_6$) gas will be drawn into and through the moving tubular contact 28 and into the cavitation region 52 during the opening operation.

For the purpose of effecting contact closure, and for charging the opening accelerating compression springs 31, there is provided a pneumatic operating mechanism 54, including a control valve 55, of the three-way type, which is rotatable within an offset portion 56 secured to the cylinder head 57. Thus, counterclockwise rotation of the control valve 55, as effected by an operating lever 59 and a vertical insulating operating rod 60, as effected by energization of a solenoid 61, will permit the passage of high-pressure operating fluid, such as compressed air, at a pressure of say 150 p.s.i.g., for example, to flow through an insulating conduit 63, and into the region 45 to the rear side of the operating piston 30. The entrance of high-pressure operating fluid, such as compressed air, will cause the piston 30 to be forced toward the left in a contact-closing direction. As a result, the moving contact 28 will engage the stationary contact structure 17 for circuit completion; and also the opening accelerating springs 31 will be charged for a subsequent opening operation.

When the circuit breaker 1 is completely closed, preferably there is provided a latching device 64, including a rotatable latch 65 having a nose portion 65a, which will engage a projection 60a of the vertically-extending insulating operating rod 60. Energization of a tripping solenoid 66 will effect release of the latch 65 and will permit a compression spring 67 to force the valve-operating rod 60 upwardly to cause clockwise rotation of the three-way valve 55, so as to effect communication between the insulating conduit 63 and an exhaust outlet 68, leading to a low-pressure region, such as atmospheric air.

It will be noted that the operating cylinder 36 and piston 30 movable therein constitutes a cavitation device 69 with the cavitation region 52 thereof communicating solely with the enclosed casing 5 by way of the movable tubular venting contact 28.

Figure 4:
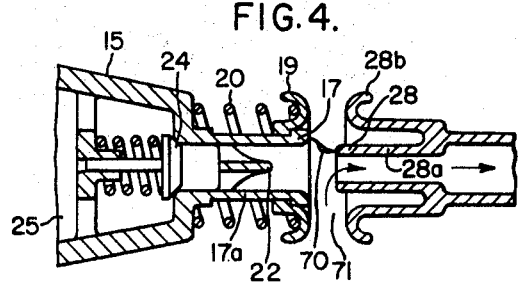
FIG. 4 illustrates the separable contact structure of FIGS. 2 and 3, but indicating the interruption of normal load currents, in which the exhaust valve is not operated.

The circuit interrupter of FIGS. 1-4 illustrates an embodiment of the invention in which the sulfur-hexafluoride (SF$_6$) gas is stored in the interrupting chamber at a moderately high value, say 100 p.s.i.g. for example. When the pneumatic control valve 55 exhausts the high pressure air behind the piston 30, the SF$_6$ gas pressure, acting on the other side of the piston 30, moves it to the right. This movement creates an exhaust space 52 behind the piston, which is filled by downstream gas flow through the moving contact 28 attached to the piston 30. This flow interrupts the arc 70 (FIG. 3) drawn by the separating contacts 17, 28. The retractable shields 19, 28b, shown in the open position in FIGS. 3 and 4, are used to minimize the voltage gradient in the contact gap 71.

Behind the hollow stationary contact 17 is shown an overpressure valve 24. When interrupting currents in excess of say, for example, 15,000 amperes, the gas pressure will rise due to the heat of the arc 70, as shown in FIG. 3, to a value sufficient to open the overpressure valve 24. The escaping gas blasts the arc terminal 22 attached to the stationary contact 17, and has the necessary additional interrupting action to extinguish the arc 70 shown in FIG. 3. The pressure falls after the arc 70 is quenched, and some of the SF$_6$ gas released, through the vent 26, allowing the spring-operated valve 24 to reseat, and stop the gas flow. An auxiliary tank 72 of SF$_6$ gas is connected to the breaker chamber 5 through a regulating valve 73, which permits enough SF$_6$ gas to flow in so that the original SF$_6$ gas pressure of say 100 p.s.i. is restored. Since there are normally very few high-current fault interruptions during the life of a power circuit breaker 1, the tank 72 of SF$_6$ gas should last for many years of service without need of replacement.

Figure 5:
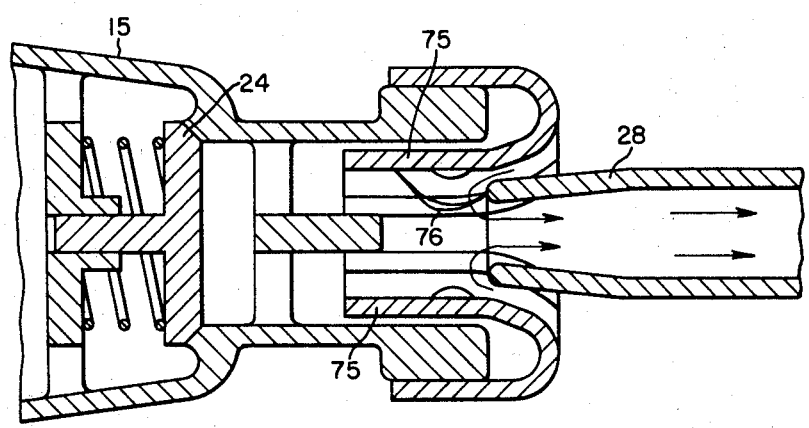
FIG. 5 is a vertical sectional view taken through a modified form of the invention, the contact structure being illustrated in the partially open-circuit position, and illustrating arc-lengthening means by magnetic action to deliberately increase the local arcing pressure to effect exhaust-valve opening.

FIG. 5 shows a different arrangement of the stationary contact fingers 75 which provides current flow to the arc in such a direction that the arc 76 tends to lengthen by electromagnetic action, moving toward the overpressure valve 24. This arc lengthening at high currents produces added local pressure to make the operation of the valve 24 more positive.

Figure 6A:
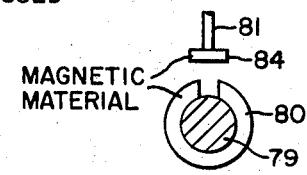
FIG. 6A is a fragmentary detail sectional view taken along the line Y—Y of FIG. 6.
Figure 6:
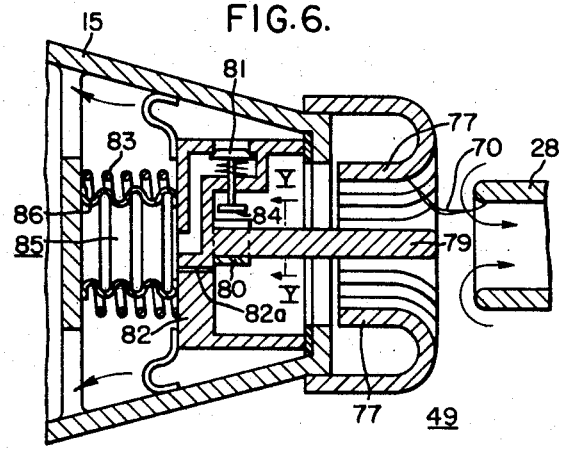
FIG. 6 illustrates another modified type of circuit interrupter, embodying the principles of the present invention, in which arc-transfer means to an arcing horn magnetically opens a pilot valve structure for dumping action to expedite exhaust-valve opening, the contact structure being illustrated in the position for interrupting low-valve currents.
Figure 7:
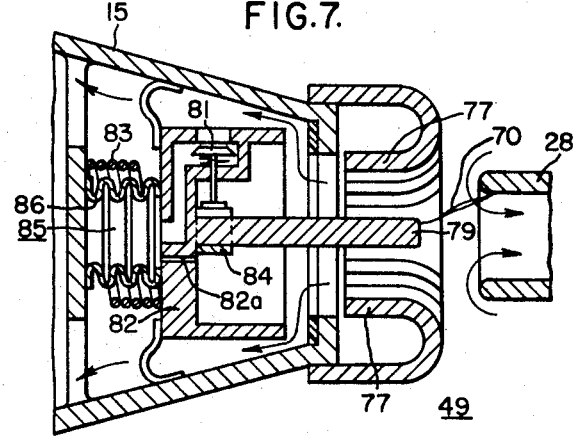
FIG. 7 illustrates the contact structure of FIG. 6 interrupting heavy currents.

Another embodiment of the invention, incorporating a different type of valve is shown in FIGS. 6 and 7 whereby transfer of the arc current from the main fingers 77 to the arcing horn 79 produces a magnetic action that opens a pilot valve 81 as shown in FIG. 7. This dumps gas behind the exhaust valve 82 so that the pressure from the breaker chamber 49 can overcome the valve spring pressure 83, and thus open the main exhaust valve 82.

In more detail, when the arc is high-current enough to transfer to the arcing horn 79, the iron ring 80 (FIG. 6A) is magnetized, attracting the armature 84 secured to the lower end of the spring-biased-closed pilot valve 81. This action opens the pilot valve 81 removing enough pressure from the region 85 within the sylphon bellows 86 to let the blast valve 82 open against the biasing spring 83. When the arc current 70 is interrupted, the pilot valve 81 closes, gas flows into the volume 85 within bellows 86 behind the valve 82 through a small opening 82a assisting the spring 83 in reclosing the main exhaust valve. It is to be noted that the valve 82 is not opened by any overcurrent, but only when the circuit breaker is actually tripped, the contacts parted, and an arc 70 drawn.

FIGS. 8–11 illustrate the application of the same general principles of opening an exhaust valve to atmosphere for high-current interruption, only arranged for use with an upstream puffer-type breaker having an insulating flow guide.

Figure 9:
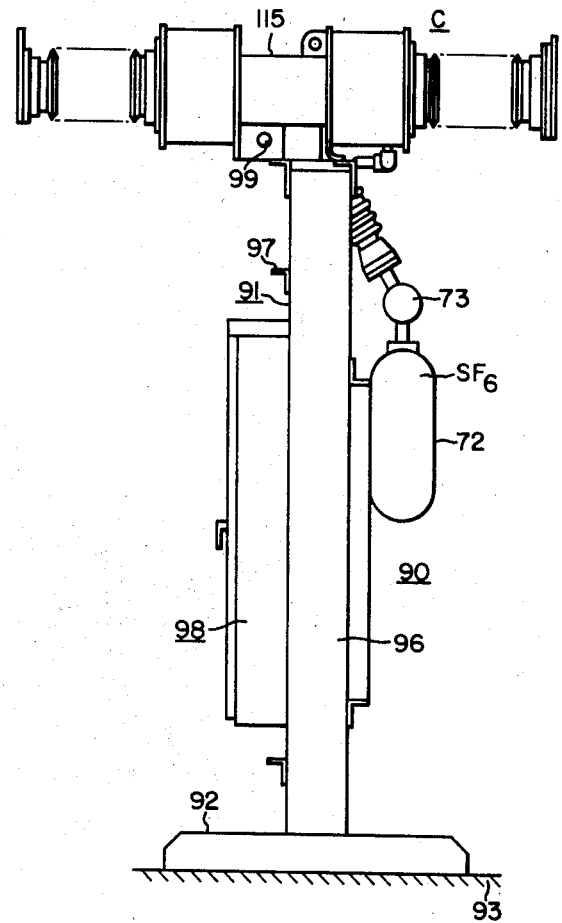
FIG. 9 is a side elevational view of the puffer-type breaker of FIG. 8.

With reference to FIGS. 8–11 of the drawings, and more particularly to FIGS. 8 and 9 thereof, the reference numeral 90 generally designates a three-pole circuit-interrupting assembly, which is mounted at the upper end of a frame support 91, the latter being welded to angle feet 92, which may rest upon a suitable base 93. The reference letters A, B and C designate the three individual circuit-interrupting pole-units, which are all identical in construction and operation.

FIG. 9 shows more clearly in side elevation how the three circuit-interrupting pole-units A, B and C, constituting a three-phase circuit interrupter 90, are mounted at the upper end of the frame support 91. The frame support 91 preferably includes a pair of upstanding channel members 96, which have cross-braces 97 welded thereacross. Disposed between the uprights 96, and positioned between the cross braces 97, is a mechanism compartment 98 housing a suitable operating mechanism, which effects simultaneous opening and closing movement of the three identical pole-units A, B and C of the circuit-interrupting assembly 90.

A rotatable operating shaft 99 mechanically interconnects the three pole-units A, B and C. As well known by those skilled in the art, a crank-arm assembly is employed within the compartment 98 and is pivotally connected to a pull-rod (not shown) extending downwardly within an enclosing tube 100 to be connected to the operating mechanism enclosed within the mechanism compartment. Generally, the actuating mechanism disposed within compartment 98 may be of any suitable type, and is operated to effect upward thrusting motion of the operating rod within the tube 100 during the opening stroke. This action is facilitated by opening accelerating springs, not shown, also disposed within the vertical housing tube. A suitable operating mechanism, not shown, is provided to effect the closing of the circuit interrupter and a charging of the aforesaid accelerating spring.

The operating mechanism may be of any desired type, such as a pneumatic, hydraulic, or may comprise a solenoid for effecting downward closing motion of the operating rod disposed within the enclosing tube 100.

With reference to FIGS. 10A and 10B, it will be noted that the rotatable operating shaft 99 is keyed to an internally-disposed operating crank-arm 101, which is welded to a forked member. The ends of the furcations, or arms 102 of the resulting bifurcated crank-arm construction, are pivotally connected by pins 103 to links 104 disposed externally of a movable puffer cylinder 105. Jutting laterally outwardly from diametrically-opposite sides of the puffer cylinder are a pair of pivot pins 106, to which the driving links 104 are connected. Thus, as viewed in FIGS. 10A and 10B, the counterclockwise rotation of the operating shaft 99 is effective to force the links 104 toward the left, and to effect leftward working motion of the operating puffer cylinder 105 over a stationary piston 108 secured to the right-hand end of a hollow insulating guide tube, or pedestal 110. As shown, the hollow insulating guide tube 110 is theaddedly secured, as at 111, to a collar 112 of a grounded interrupter housing, generally designated by the reference numeral 115.

As is shown in more detail in FIGS. 10A and 11 of the drawings, the movable contact structure comprises a plurality of circumferentially-disposed contact fingers 117 and an internally-disposed movable tubular contact portion 118, which directs the gas flow toward the left, as viewed in FIG. 10A, and through lateral ports 120.

It will be observed that the stationary venting contact 124 has an inner arcing-horn portion 126 fixedly secured by a spider-supporting portion 127 communicating with the exhaust valve 128 (FIG. 10B), which opens only on overpressure conditions resulting from high-current interruption. It will be noted that the movable insulating flow guide 130 maintains the pressure within the arcing region 132, so as to contain the high pressure needed to operate the overpressure valve 128.

FIG. 11 illustrates the circuit interrupter 90 during the interruption of heavy fault-current interruption in which the pressure conditions are so excessive as to effect opening of the exhaust valve 128 to exhaust to atmosphere through the vent opening 135 (FIG. 10B). It will be apparent that there is consequently provided opposite venting action through both the tubular venting contact 118 and also outwardly through the blast valve 128 and into the exhaust chamber 137. The enclosing action of the insulating flow guide 130 assures a sufficient rise in pressure in region 132 on high-current interruption to open the valve 128 at the base of the hollow stationary contact, setting up thereby double-nozzle interruption action for effective arc quenching.

From the foregoing description of the invention, it will be noted that there has been illustrated and described various forms of improved fluid-blast circuit interrupters, particularly adapted for those of the piston-flow type in which a pair of separable contacts cooperate, one of them having an exhaust valve associated therewith, which is opened only on overpressure conditions for high-current interruption only. The other cooperating separable contact may have, preferably, a hollow tubular venting construction to assist in carrying the arc terminal inwardly thereof for lengthening the same on low instantaneous current values.

Although there has been illustrated and described specific structures, it is to be clearly understood that the same were merely for the purpose of illustration, and that changes and modifications may readily be made therein by those skilled in the art without departing from the spirit and scope of the invention.

I claim as my invention:

1. A fluid-blast circuit interrupter including a pair of separable venting contacts, one of which has an overpressure exhaust valve controlling the vent therethrough and disposed in close proximity to the arcing region, said exhaust valve being solely responsive to the pressure value generated within the arcing region, means for creating fluid flow through the other venting contact, whereby upon the interruption of current of a predetermined excessive magnitude, the arcing pressure generated will be sufficient to force said overpressure exhaust valve to open thereby creating additional venting and interrupting action, said overpressure exhaust valve remaining closed during the interruption of currents having an amperage value below said predetermined magnitude.

2. The combination of claim 1, wherein a cavitation device is provided to effect the fluid flow through said other venting contact.

3. The combination of claim 2, wherein an outer pair of relatively movable electrostatic shields encircle the separable contacts to control the electric field at the region of arcing.

4. The combination of claim 1, wherein magnetic means is provided to increase arc lengthening and so increase the local arcing pressure to facilitate overpressure exhaust valve opening.

5. The combination of claim 4, wherein the magnetic means comprises one or more reverse bent contact fingers.

6. The combination according to claim 1, wherein said one contact has an arcing horn encircled by a magnetic ring, and a pilot valve for exhausting the pressure behind the valve is provided and is actuated by an armature attracted to said magnetic ring.

7. The combination of claim 6, wherein a bellows at least partially biases the valve closed and has the pressure of the enclosed volume controlled by said pilot valve.

8. The combination of claim 1, wherein piston means moves with said other contact and a movable flow-guide member confines the arcing pressure.

9. The combination of claim 8, wherein said one contact is stationary and said other contact includes an inner movable venting contact and a plurality of outer movable contact fingers.

References Cited

UNITED STATES PATENTS

| | | | |
|---|---|---|---|
| 2,084,885 | 6/1937 | Biermanns. | |
| 2,304,529 | 12/1942 | Baker. | |
| 2,925,484 | 2/1960 | Thommen | 200—148 |
| 3,164,703 | 1/1965 | Friedrich et al. | 200—148 |
| 3,257,533 | 6/1966 | Leeds. | |
| 3,274,365 | 9/1966 | Beatty | 200—148 |
| 3,290,469 | 12/1966 | Leeds | 200—148 |
| 3,310,648 | 3/1967 | Baltensperger | 200—148 |
| 3,330,927 | 7/1967 | Lee | 200—148 |
| 3,214,553 | 10/1965 | Leeds | 200—148 |
| 3,052,783 | 9/1962 | Buron | 200—148 |

FOREIGN PATENTS

| | | |
|---|---|---|
| 1,002,440 | 2/1957 | Germany. |
| 1,192,722 | 5/1965 | Germany. |
| 1,227,539 | 10/1966 | Germany. |
| 615,030 | 12/1948 | Great Britian. |

ROBERT K. SCHAEFER, Primary Examiner

R. A. VANDERHYE, Assistant Examiner